US006347455B2

(12) United States Patent
Brant et al.

(10) Patent No.: US 6,347,455 B2
(45) Date of Patent: Feb. 19, 2002

(54) STRING TRIMMER HEAD

(75) Inventors: Ronald G. Brant, Smyrna; John L. Beafore, Franklin, both of TN (US)

(73) Assignee: Murray, Inc., Brentwood, TN (US)

( * ) Notice: Subject to any disclaimer, the term of this patent is extended or adjusted under 35 U.S.C. 154(b) by 0 days.

(21) Appl. No.: 09/740,023

(22) Filed: Dec. 20, 2000

Related U.S. Application Data

(60) Provisional application No. 60/172,578, filed on Dec. 20, 1999.

(51) Int. Cl.[7] ........................... B26B 27/00; A01D 55/18
(52) U.S. Cl. ......................... 30/276; 30/347; 56/12.7; 56/295
(58) Field of Search .................... 30/276, 347; 56/12.7, 56/12.1, 295

(56) References Cited

U.S. PATENT DOCUMENTS

| | | | |
|---|---|---|---|
| 4,035,912 A | 7/1977 | Ballas et al. | 30/276 |
| 4,054,992 A | 10/1977 | Ballas et al. | 30/276 |
| 4,097,991 A | 7/1978 | Proulx | 30/276 |
| 4,104,797 A | 8/1978 | Ballas | 30/276 |
| 4,118,864 A | 10/1978 | Pittinger, Sr. et al. | 30/276 |
| 4,138,810 A | 2/1979 | Pittinger, Sr. et al. | 30/276 |
| 4,162,575 A | 7/1979 | Ballas | 30/347 |
| 4,244,103 A | 1/1981 | Snarr | 30/276 |
| 4,301,642 A | 11/1981 | Thurber | 30/276 |
| 4,335,510 A | 6/1982 | Close et al. | 30/276 |
| 4,411,069 A | 10/1983 | Close et al. | 30/276 |
| 4,571,831 A | 2/1986 | White, III | 30/276 |
| 4,651,421 A | 3/1987 | Zerrer | 30/347 |
| 4,835,867 A | 6/1989 | Collins et al. | 30/276 |
| 4,888,871 A | 12/1989 | Engelbrecht | 30/276 |
| 5,109,607 A | 5/1992 | Everts | 30/276 |
| 5,193,278 A | 3/1993 | Osakabe et al. | 30/276 |
| 5,276,968 A * | 1/1994 | Collins et al. | 30/276 |
| 5,303,476 A | 4/1994 | Tuggle | 30/347 |
| 5,406,708 A | 4/1995 | Stephens et al. | 30/276 |
| 5,758,424 A | 6/1998 | Iacona et al. | 30/347 |
| 5,855,068 A | 1/1999 | Zilly et al. | 30/276 |
| 5,887,348 A | 3/1999 | Iacona et al. | 30/276 |
| 5,896,666 A | 4/1999 | Iacona et al. | 30/276 |
| 6,108,914 A * | 8/2000 | Sheldon | 30/276 |

* cited by examiner

*Primary Examiner*—Hwei-Slu Payer
(74) *Attorney, Agent, or Firm*—Kevin E. Joyce

(57) ABSTRACT

A string trimmer head is provided for receiving and retaining separate lengths of string supplied from outside the head. String lengths passing through openings in the periphery of the head are held by clamping members provided within the head. The clamping members are selectively opened by activation of respective slidable members provided on the upper surface of the head in order to release short lengths of previously supplied string and/or to permit the receipt of new string lengths. On release of the slidable members, the respective clamping members move towards one another for clamping purposes under the influence of springs.

6 Claims, 2 Drawing Sheets

STRING TRIMMER HEAD

This application claims benefit to No. 60/172578 filed Dec. 20, 1999.

BACKGROUND OF THE INVENTION

1. Field of the Invention

The present invention relates to an improved head for a string trimmer of the type which does not use a spooled or coiled supply of string.

2. Prior Art

String trimmers are well known wherein a spool or coil of string is retained within the head of the trimmer. Such arrangement requires that the head be disassembled when a new supply of string becomes necessary. Additionally, when the string breaks, the head often must be disassembled in order to correct the problem and to adjust the string supply for resumption of operation. Such disassembly of the head is cumbersome and requires a certain amount of dexterity by the operator of the trimmer.

To overcome deficiencies of the type just described, attempts have been made to supply string to a trimmer head from outside the head.

An example of such an arrangement is disclosed in U.S. Pat. No. 5,758,424 wherein a pair of spring-loaded cams are disposed within the trimmer head at locations adjacent openings in the sidewall of the head through which string ends may be inserted. The sidewall includes an inwardly extending deflection at each opening towards which the respective cams are urged by their springs. As a result, a string passing through an opening is pressed against a sidewall deflection by the associated cam to retain the string.

SUMMARY OF THE INVENTION

The present invention represents an improvement over the arrangement disclosed in the aforesaid U.S. Pat. No. 5,758,424 by providing an arrangement wherein the string is more easily inserted or removed from the trimmer head and is more securely held in operation position. The arrangement also permits simplified removal of broken string, is more durable than known arrangements and minimizes wear on the string during operation.

More particularly, the improved arrangement employs a pair of clamping jaws for each strand of string to be held by the trimmer head. A slidable actuator is associated with each pair of jaws. Each actuator is easily accessible to the operator to permit the jaws pairs to be selectively opened and closed. This feature is particularly useful when worn or broken string is being replaced. Also, the actuators may be used when inserting a new length of string into the trimmer head.

BRIEF DESCRIPTION OF THE DRAWINGS

The invention will be described in greater detail with reference to the accompanying drawings wherein.

DETAILED DESCRIPTION OF PREFERRED EMBODIMENT OF THE INVENTION

Figure 1:
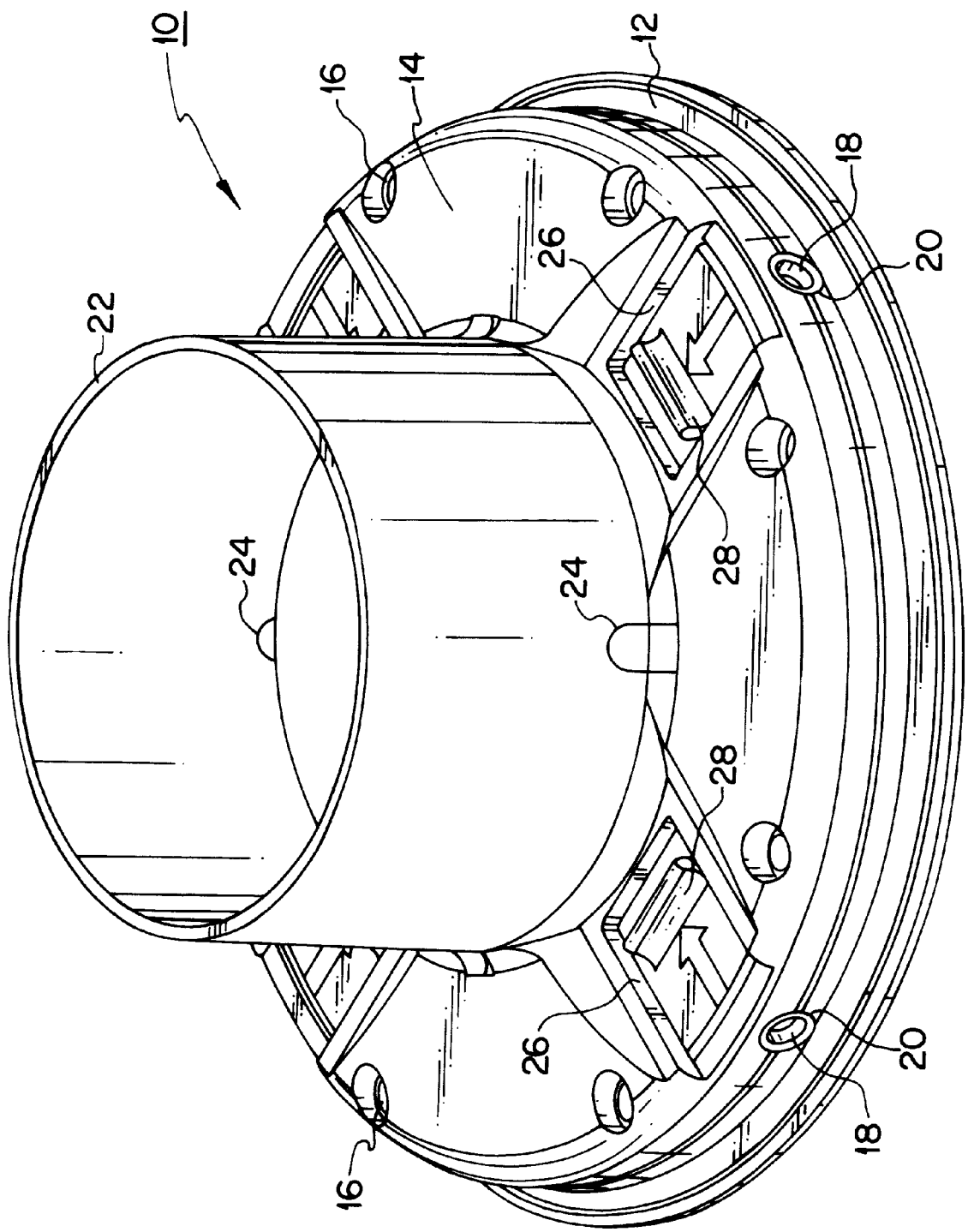
FIG. 1 is a perspective view of a trimmer head according to the invention.

Referring to FIG. 1, a trimmer head 10 comprises a base portion 12 and a cover portion 14. The base and cover portions are held together by fasteners 16, such as screws. The mating sidewalls of the base and cover portions are provided with aligned semi-circular notches so as to define a plurality of openings 18 providing access to the interior of the head. The openings are arranged at spaced locations about the periphery of the head. In the embodiment illustrated, openings 18 are disposed at 90° spacings about the head. Each opening receives an eyelet or grommet 20 which provides a smooth surface for string passing through the openings thereby reducing wear on the strings during operation.

A collar or hub 22 is mounted on the upper surface of the cover portion 14 to surround and shield a drive arrangement (not shown) which extends to the trimmer head from a conventional trimmer motor and handle (also not shown for convenience of illustration). The base of hub 22 is provided with openings 24 to permit tools to be inserted within the hub. The upper surface of cover portion 14 also is provided with openings 26 which are radially aligned with openings 18 and through which respective actuator bars 28 project to permit their being accessible to the operator for the purpose now to be described.

Figure 2:
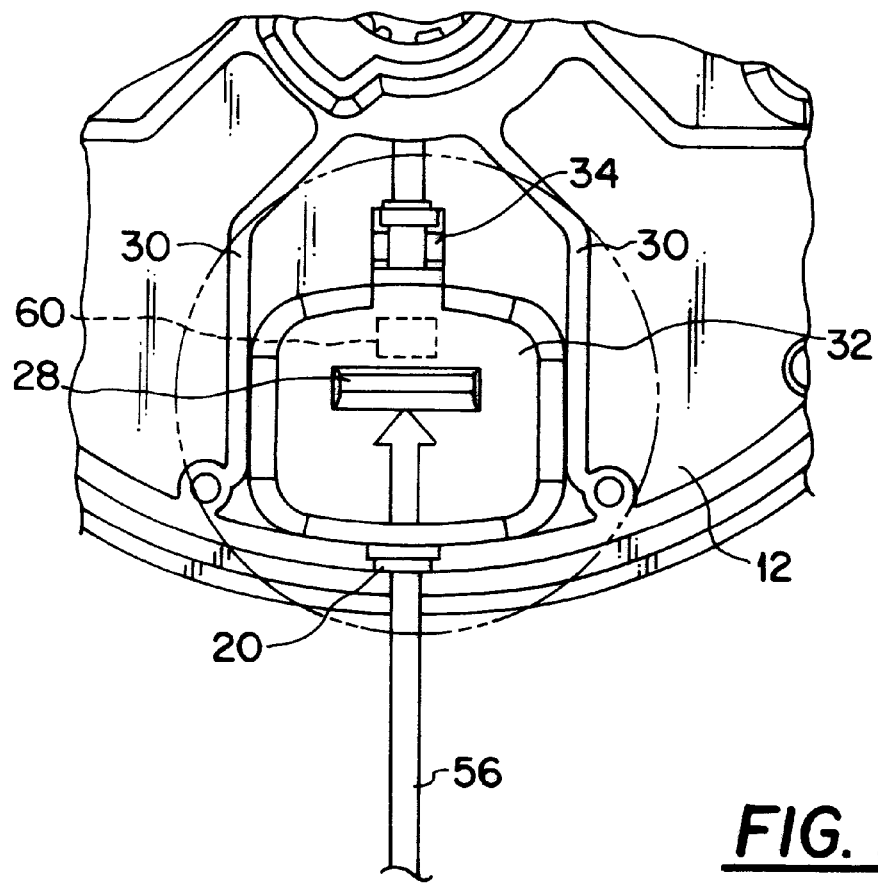
FIG. 2 is a top plan view of a segment of the base portion of the trimmer head shown in FIG. 1.
Figure 3:
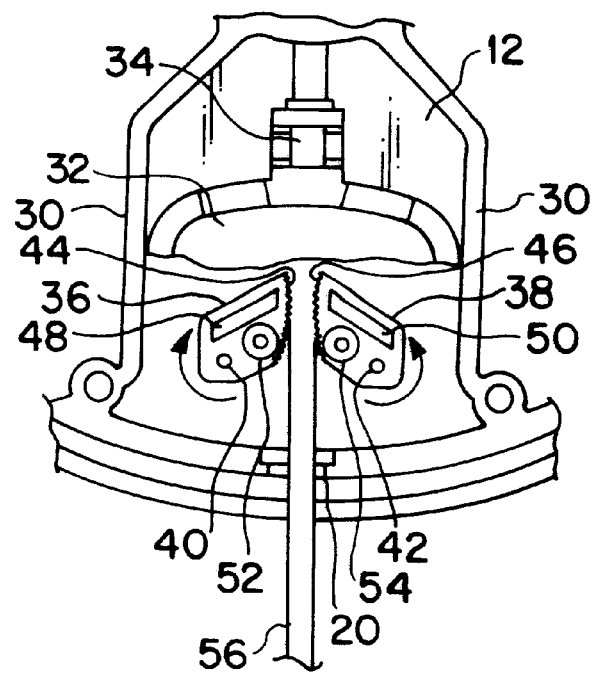
FIG. 3 is a partial cut-away view of the base portion of the trimmer head shown in FIG. 2.

Referring to FIGS. 2 and 3, the upper surface of the base portion 12 is formed with a pair of projecting ribs 30 between which a slidable member 32 is disposed. The actuator bar 28 is fixed to the upper surface of member 32. Ribs 30 guide member 32 as it slides on the upper surface of portion 12 towards and away from the rotational axis of the trimmer head 10. A compression spring 34 is secured to the base portion 12 in contact with the inner end of member 32 so as to urge the outer end of member 32 into engagement with the mating sidewalls of the base portion 12 and cover portion 14.

A pair of mirror-imaged clamping jaws 36 and 38 are pivotally connected to the base portion 12 at respective axes 40 and 42 equally distanced from a line extending from the center of opening 18 to the center of the trimmer head. Jaws 36 and 38 are provided with complementary serrated edges 44 and 46 which face one another. These edges line along a line curvature which is eccentric to the respective axes 40 and 42.

The upper surfaces of the jaws 36 and 38 are provided with upwardly projecting ribs 48 and 50 having longitudinal axes each of which is disposed at an acute angle relative to a line from the center of opening 18 to the center of head 10. A pair of rollers 52 and 54 are joined to the underside of the slidable member 32 and are positioned to engage projections 48 and 50, respectively.

The operation of the trimmer head just detailed will now be described.

When the actuator bar 28 is displaced by the operator towards the center of the trimmer head to move member 32 in the direction indicated by the arrowhead in FIG. 2, rollers 52 and 54 transmit such displacement, via ribs 48 and 50, the rotation of the jaws 36 and 38 about their respective pivotal axes 40 and 42 to spread apart the complementary serrated edges 44 and 46 of the jaws. This permits a length of string 56 to be inserted within the trimmer head 10 through an eyelet or grommet 20 from outside the head. When the actuator bar 28 is released, the force of spring 34, which was compressed when the jaws were separated, causes the slidable member 32 to move in the opposite direction whereby the jaws rotate about their respective pivotal axes in the direction indicated by the arrowheads in FIG. 3 to clamp the string between the serrated edges 44 and 46. The string thus is easily loaded into the trimmer head by an operation which requires minimum dexterity on the part of the operator.

By the operational steps just described, the string can be removed from the head or repositioned relative thereto.

When the trimmer head is rotated during a cutting operation, its centrifugal force urges the serrated surfaces 44 and 46 towards one another thereby increasing the gripping force on the string ensuring that it remains in its desired position. With the arrangement described, the gripping force on the string is increased as compared with an arrangement of the type described in the above-identified U.S. Pat. No. 5,758,424. Additionally, the stresses experienced during cutting are distributed through the jaws over a larger area of the base plate thereby making the trimmer head more durable.

A further feature of the present invention is the provision of an opening 60 in the bottom of the base portion 14 (see FIG. 2) located between the jaws and the inner end of slidable member 32. In the case where a string breaks, the release of the jaws on the remaining string segment, by movement of bar 28 followed by inward displacement of the released segment caused when a new string is inserted through opening 18, results in such segment dropping from the trimmer head through opening 60.

In the description of operation just presented, the actuator bar is displaced by the operator while loading new string into when removing broken string segments. It will be understood, however, that the insertion of a string end through an eyelet or grommet 20 into engagement with jaws 36 and 38 causes the jaws to spread as the string is further advanced. When such advancement is stopped, the bias of spring 34 locks the string in position. If a broken string segment is gripped by the jaws when a new length of string is inserted into the head, the new string engages and advances the broken segment so as to release the jaws' clamping force thereby allowing the broken segment to e discharged from the head through opening 60 and the new string to be inserted into the head in replacement of the broken segment.

What is claimed is:

1. A head for a string trimmer of the type which receives lengths of string introduced from outside the head, comprising:
    a base portion;
    a cover portion removably secured to the base portion to form a trimmer head body having a central axis of rotation;
    a plurality of spaced openings provided in said head body radially of said central axis for receiving respective lengths of string introduced within the head body from outside said body;
    a plurality of openings on an upper surface of the cover portion, each being aligned with a respective one of said radially spaced openings;
    a plurality of slidable members positioned within respective ones of the openings on the upper surface of the cover portion, each slidable member being movable towards and away from the central axis of the head body;
    a plurality of springs, each associated with a respective one of the slidable members to normally urge the slidable members towards the respective radially spaced openings in the head body;
    a plurality of pairs of clamping members mounted within the head body, each pair underlying a respective slidable member;
    a plurality of camming arrangements, each operatively joining a respective slidable member with its associated pair of clamping members and being operative to separate its associated clamping members when the slidable member is moved towards the central axis of rotation of the head body and to allow the clamping members to move towards one another when the slidable member moves towards its respective radially spaced opening in response to force applied to the slidable member by its associated spring, the clamping members being configured to engage respective lengths of string within the head body and to clamp said string with increased force in response to centrifugal force occurring when the head is rotated about said central axis of rotation.

2. A head according to claim 1, wherein each of said slidable members is retained in position and is guided by a pair of spaced ribs projecting from an underside of the cover portion.

3. A head according to claim 1, wherein said clamping members are pivotally mounted to the base portion, each clamping member having a clamping surface which is eccentric to an axis about which the clamping member is pivotally mounted.

4. A head according to claim 3, wherein said camming arrangement for each clamping member comprises a roller provided on one of either the clamping member or the respective slidable member, and a rib provided on the other of either the clamping member or the respective slidable member, said rib being disposed at an acute angle relative to a line from the central axis of rotation to the respective radially spaced opening whereby when the rib and the roller engage as the respective slidable member is moved towards the central axis of rotation, the clamping members separate.

5. A head according to claim 4, wherein each of said slidable members is retained in position and is guided by a pair of spaced ribs projecting from an underside of the cover portion.

6. A head according to claim 5, further comprising openings provided in said base portion substantially underlying the slidable members for permitting discharge of loose string from within the head.

* * * * *